United States Patent
Blount et al.

(10) Patent No.: US 6,895,230 B1
(45) Date of Patent: May 17, 2005

(54) SYSTEM AND METHOD FOR DELAY EQUALIZATION OF MULTIPLE TRANSMISSION PATHS

(75) Inventors: Richard J. Blount, Federal Way, WA (US); Jay D. Peterson, Seattle, WA (US)

(73) Assignee: Kathrein-Werke KG, Rosenheim (DE)

(*) Notice: Subject to any disclaimer, the term of this patent is extended or adjusted under 35 U.S.C. 154(b) by 579 days.

(21) Appl. No.: 09/641,432

(22) Filed: Aug. 16, 2000

(51) Int. Cl.[7] .................. H04B 17/00; H01Q 11/22; G01S 7/40

(52) U.S. Cl. .................. 455/276.1; 455/561; 455/67.11; 455/121; 455/193.1; 375/226; 375/349; 342/174; 342/375

(58) Field of Search .................. 455/269, 276.1, 455/121, 193.1, 67.11, 67.14, 67, 16, 561, 562.1, 502–506; 375/140, 224, 226, 346, 349; 342/172, 174, 165, 371, 372, 375, 368

(56) References Cited

U.S. PATENT DOCUMENTS

| | | | | |
|---|---|---|---|---|
| 3,733,565 A | * | 5/1973 | Pierret | 333/28 R |
| 3,842,247 A | * | 10/1974 | Anderson | 702/58 |
| 3,970,926 A | * | 7/1976 | Rigby et al. | 324/621 |
| 4,160,958 A | * | 7/1979 | Mims et al. | 331/178 |
| 4,363,131 A | * | 12/1982 | Froese et al. | 455/42 |
| 4,750,133 A | * | 6/1988 | Eiskamp et al. | 700/266 |
| 5,060,728 A | * | 10/1991 | Yan | 166/279 |
| 5,412,414 A | * | 5/1995 | Ast et al. | 342/174 |
| 5,530,449 A | * | 6/1996 | Wachs et al. | 342/174 |
| 6,133,868 A | | 10/2000 | Butler et al. | 342/174 |
| 6,157,343 A | * | 12/2000 | Andersson et al. | 342/371 |
| 6,236,839 B1 | * | 5/2001 | Gu et al. | 455/67.4 |

OTHER PUBLICATIONS

Google, "Analysis of experimental data using the method of least squares", Unknown document posted at www4.ncsu.edu website.*

* cited by examiner

Primary Examiner—Duc M. Nguyen
(74) Attorney, Agent, or Firm—Fulbright & Jaworski LLP

(57) ABSTRACT

The present invention provides systems and methods for addressing the effects of non-linear phase response, such as by equalizing electrical delays among transmission paths. A preferred embodiment provides phase detection circuitry and phase adjustment circuitry in the signal paths of a multiple beam or phased array antenna to provide delay equalization of the signal paths. Communication systems implementing the systems and methods of the present invention are provided broadband phase calibration and, therefore, are enabled to provide controlled and predictable beam forming over a broad range of frequencies.

52 Claims, 4 Drawing Sheets

SYSTEM AND METHOD FOR DELAY EQUALIZATION OF MULTIPLE TRANSMISSION PATHS

RELATED APPLICATIONS

The present invention is related to co-pending and commonly assigned U.S. patent application Ser. No. 09/092,429 entitled "System and Method for Fully Self-Contained Calibration of an Antenna Array," filed Jun. 5, 1998, the disclosure of which is hereby incorporated herein by reference.

TECHNICAL FIELD

The present invention generally relates to wireless communication systems. In particular, the present invention relates to a delay adjustment technique for signal paths in a wireless communication system.

BACKGROUND

Wireless communications often rely upon the controlled radiation/reception of radio frequency (RF) signals. For example a wireless communication system may utilize an antenna array adapted to radiate and/or receive signals within predefined areas, such as through the use of directional antenna beams. Such antenna beams may be formed using an array of multiple antenna elements arranged in a particular pattern, such as spaced a certain wave length apart, designed to form desired antenna beam patterns based on the amplitude and/or phase of the RF signals that are provided to drive each element within the array.

In a phased array antenna system, a beam forming matrix, such as a Butler matrix, providing antenna beam interfaces for coupling with base station transceiver equipment through multiple paths and antenna element interfaces for providing RF beam component signals to the antenna array. Accordingly, the beam forming matrix includes circuitry for controlling the phase and/or amplitude of generated RF beam component signals. For the system to function predictably and/or to consistently form desired antenna beams, beam forming relies on a known distribution of phase and amplitude among the RF signals in getting to the RF feed points of the antenna array. That is, for the system to provide consistent and predictable beam forming, the beam forming matrix should provide the antenna array signals with acceptably certain phase and amplitude characteristics.

However, there is often an appreciable length of transmission line and a number of components, such as amplifiers and filters, disposed in the transmission lines between transceiver equipment and the antenna array. There are often differences in the physical and/or electrical delays of the multiple paths, e.g., individual antenna beam signal paths, coupling an antenna array to associated transceiver equipment. Accordingly, the phase of signals as provided to a beam forming matrix may experience differing amounts of delay and, thus, result in undesired phase differentials there between. Moreover, there may be various electrical and/or physical path differences within a beam forming matrix. Accordingly, the phase of signals as provided to the antenna elements of an antenna array may experience differing amounts of delay and, thus, result in undesired phase differentials there between. Phase differences on the order of a few nanoseconds when providing beam forming for signals in the 800 MHz frequency range and up can result in significant degradation of the desired radiation pattern.

Signals provided to a beam forming matrix and/or to the antenna elements of an antenna array may also experience different levels of amplification and/or attenuation. However, signal amplitude differentials are generally not experienced in sufficient magnitudes to significantly affect beam forming attributes.

Controlling (or knowing) the signals' relative phases after propagating through the different transmission paths is difficult because the different paths affect the phase of each signal differently. These difference are attributable to the transmission paths having different associated delays. The differing delays result from the paths having different electrical lengths and non-linearities associated with high order filters with steep roll-off characteristics.

Often systems are phase calibrated, such as at the time of assembly or deployment, to account for known transmission path delay differences, such as those associated with physical line length differences of multiple transmission paths. However, such calibration is generally only effective for a particular operating frequency. For example, RF signals as provided to a beam forming matrix, or as provided to the individual antenna elements of an antenna array, can be phase balanced at one frequency, but generally will not remain phase balanced within acceptable limits over a wide band of different frequencies.

However, communication systems, such as cellular telephony systems, often perform over a relatively wide frequency range (e.g., 40–50 MHz range of the 800 to 900 MHz spectrum of an advanced mobile phone service (AMPS) system). Accordingly, a system calibrated for a particular frequency of this frequency range may experience desired beam forming with respect to signals modulated at this carrier frequency while signals modulated at other frequencies of the frequency band may experience beam forming of a less desirable quality. Unfortunately, it is not practicable to re-calibrate a system for separate operating frequencies. This problem is compounded when the frequency range is further widened. For example, if a common transmission structure were to be utilized both for providing traditional analog AMPS cellular telephony communications and digital personal communication services (PCS) communications, thus requiring the system to operate over the frequencies of both services, the range of operating frequencies would vary even further from the calibration frequency.

Accordingly, what is needed is a method and system for providing to an antenna array signals having know phase relationships over multiple and different transmission paths across a desired frequency range.

SUMMARY OF THE INVENTION

These and other objects, features and technical advantages are achieved by a system and method which provides a delay equalized transmission system that allows consistent pattern formation for a relatively wide range of frequencies. According to a preferred embodiment of the present invention, delay characteristics of various relevant transmission paths are measured and delay corrected to minimize the effects of a non-linear phase response and to equalize the linear phase delay among the transmission paths.

In one embodiment, the electrical delay for each transmission path over a predetermined frequency range is determined. The delay is derived in terms of phase change versus frequency change for each path. Once the phase versus frequency function is determined, the linear component of that function is extracted so that a constant delay can be derived. Accordingly, this embodiment of the present invention operates to measure a frequency versus phase or phase versus frequency function, extract the linear component of that function, and equate that to an electrical delay.

Once the delays have been derived for each relevant path, one path is selected as a reference and the other paths are modified (e.g., electrically lengthened) so that their delays conform to that of the reference path. In this way, all of the path delays are substantially equal to one another. When the electrical delays for each path are the same and these electrical delays are linearized over a desired frequency band, then the system can operate in a broadband mode. Frequency can be changed and although the phase will be different at the different frequencies, the phase change across the different transmission paths will be substantially the same and thus phase coherency remains in tact.

According to a preferred embodiment, a step frequency or swept frequency measurement is utilized in determining signal path delay. For example, the present invention may start at one end of the frequency band, measure the phase delay experienced, increment/decrement a predetermined amount of frequency, and again measure the phase delay experienced. Preferably the entire frequency band is stepped through, although some portion thereof might be utilized, such as a statistical sample. The frequency steps of the preferred embodiment are determined through reference to such factors as the length, physical and/or electrical, of the signal paths, the frequencies to be utilized therewith, and/or the like. Preferably, the steps are kept small enough that a phase rollover, i.e., a complete cycle, is not experienced in the phase detector. Such an embodiment is preferred because it simplifies the accumulation of the total amount of phase shift as the frequency band is stepped through.

Once the phase versus frequency function has been determined from the phase information provided by the above mentioned frequency sweep, a linear fit may be performed on that data to extract the linear component of that function. This linear component, which is the slope of the phase versus frequency function in a preferred embodiment, is utilized according to a preferred embodiment of the present invention to provide information with respect to a constant electrical delay. For example, operation according to the present invention may measure the phase versus frequency slope on all relevant signal paths, thereby determining the differences in delay associated with each such signal path, identifying a reference signal path delay, and correcting the remaining relevant signal paths such that all the slopes are the same. This being accomplished, all the delays of the relevant signal paths are the same.

According to a preferred embodiment, correction of the signal path delays is accomplished by adding additional lengths of transmission line into such signal paths. For example, one embodiment of the present invention utilizes a binary weighted delay line for each such signal path to allow selection of a desired amount of delay. Such a binary weighted delay line may be provided by a selectable set of predetermined signal line lengths, such as transmission lines of one wave length, two wave lengths, four wave lengths, etc. At a frequency of 894 MHz a wave length equates to approximately 1.1 nanosecond. Accordingly, the preferred embodiment binary weighted delay lines allow selection of various delays from any combination of delays of 1.1 nanosecond of delay, 2.2 nanoseconds of delay, 4.4 nanoseconds of delay, etc. For example, if it is determined that approximately 5 nanoseconds of delay are desired, the system may select both the 1.1 nanosecond delay and the 4.4 nanosecond delay in series in the transmission path to provide a total of 5.5 nanoseconds of delay.

It should be appreciated that the electrical delay equalization of the present invention allows phase calibration of signal paths, such as the antenna beam signal paths coupling a phased array antenna panel to transceiver equipment, to hold over a broad range of operating frequencies. This permits formation of sector patterns that remain constant over the entire operating band. Such a technique is useful when using a multiple beam antenna system, such as those used in cellular telephony applications, where a number of signal paths, such as those of the various antenna beams, are utilized in communicating relatively low power signals in controlled areas, such as to promote frequency reuse and to improved signal quality and/or capacity. Moreover, the technique of the present invention is particularly useful with a dual mode system, such as the Spotlight® 2000 smart antenna system available from Metawave Communications Corporation, the assignee of the present application, where the frequency bands of multiple communication systems or networks, such as those of analog AMPS and digital PCS services, are communicated through common antenna structures.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

A. Overview

Figure 1:
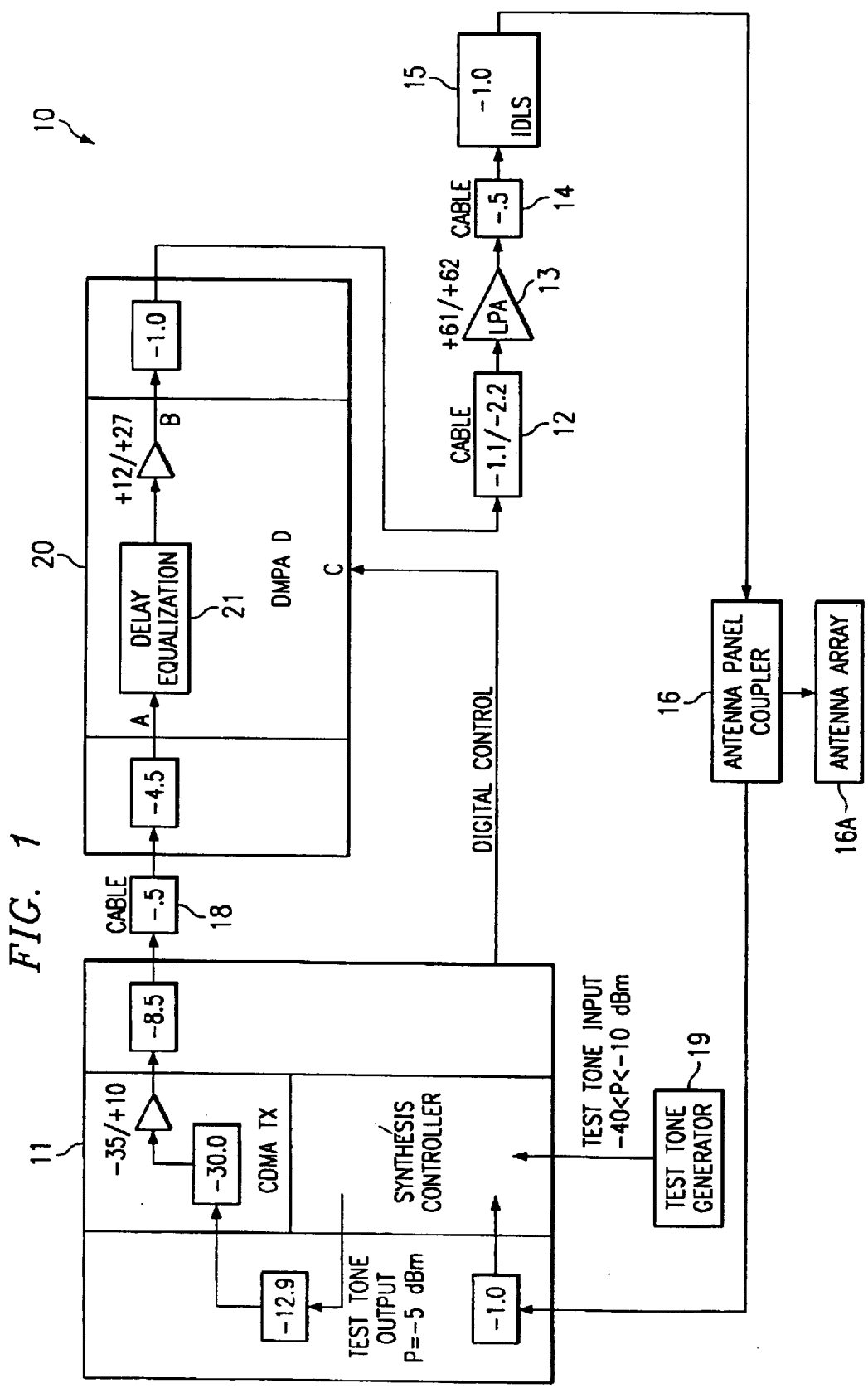
FIG. 1 shows a block diagram of one embodiment of a delay equalization system of the present invention.

With a preferred embodiment of the present invention, a system and method are provided for averaging the effects of non-linear phase response and equalizing the electrical delays among the transmission paths that feed a phased-array antenna. Transmission path delay equalization according to the present invention facilitates broadband phase calibration of multiple element arrays.

With a constant electrical delay, there is a linear relationship between phase change versus frequency change. Thus, delay can be derived by taking the derivative of phase as a function of frequency. Accordingly, delay can be estimated by averaging differences in phase versus differences in frequency over an acceptable frequency range and extracting a linear component from the phase versus frequency function over this range.

In one embodiment, phase calibration of a number of transmission paths is generally performed according to the following steps. Initially, information is determined regarding phase shift versus frequency for each of the relevant transmission paths, such as by utilizing relative phase detecting or phase comparator circuitry. Preferred embodiment relative phase detecting circuitry is shown and described in the above referenced patent application entitled "System and Method for Fully Self-Contained Calibration of an Antenna Array."

After determining phase shift versus frequency information, a slope of a linear fit is preferably extracted from this information, e.g., extracted from a phase versus frequency curve. The delays for each relevant path are then preferably computed from the slopes of their linear extractions. According to a most preferred embodiment, the path with the longest delay is selected as a reference path. Delay may then be added to each of the other relevant paths so that their delay is substantially equal to that of the reference path.

The addition of delays in the transmission paths according to a preferred embodiment is accomplished using a binary-controlled delay equalization circuit, such as that shown and described in co-pending and commonly assigned U.S. patent Ser. No. 09/384,114 entitled "Multi-Layer Switched Line Phase Shifter," the disclosure of which is hereby incorporated herein by reference, connected in each path so that appropriate delay can be added to the non-reference paths. Of course other techniques may be utilized according to the present invention, such as selection of an appropriate individual transmission line length, the use of adjustable delay devices such as a digital signal processor (DSP), and/or the like.

With regard to the principles behind the invention, a phase-shifted waveform is displaced in time by the phase delay, or $$T_p = \beta/\omega$$

where $\beta = \phi\pi/180$ radians and $\omega = 2\pi f$ in radians per second which results in $$T_p = \phi/360f$$

However, absolute phase measurements across the frequency band may not be possible because the phase detector may provide a modulo 360 degree output. One way to address this phase measurement problem is to use the change in phase versus change in frequency to track phase shift as a test frequency is swept over the operating band. So long as the frequency change increments are small enough, a phase roll-over condition can be detected and properly addressed. The phase delay in terms of the slope of this tracked (or mapped) function can be expressed as, $$T_p = 1/360(\Delta\phi/\Delta f)$$

Thus, in one embodiment of the invention, a method measures and accumulates the changes in phase versus changes in test signal frequency over the desired operating band (e.g., the A or B cellular band, a PCS band, or multiple bands where a plurality of services are accommodated) in relatively small frequency steps. Delay is then derived from the slope of a linear fit of the phase versus frequency data points (which correspond to the acquired phase versus frequency function). The linear fit (e.g., least squares method) is preferably used to average non-linear phase shifts, which are primarily due to high-order filters or filter cascades in the transmission paths.

B. Equalization System

FIG. 1 shows one embodiment of a system for equalizing transmission paths in a communication system, such as between radio equipment (i.e., receivers, transmitters, and/or transceivers) and an antenna array. It should be appreciated that in order to present the concepts of the present invention in a more easily understandable manner, the circuit of FIG. 1 has been simplified to illustrate only a single transmission path. However, it should be understood that it is envisioned that multiple transmission paths, such as comprising cable portion 18, preamp module 20, cable portion 12, linear power amplifier (LPA) 13, cable portion 14, and filter 15, may be utilized by the communication system and, thus, equalized according to the present invention. For example, where a multiple beam antenna system is utilized, such as shown in the above referenced patent application entitled "System and Method for Fully Self-Contained Calibration of an Antenna Array" or as shown in co-pending and commonly assigned U.S. patent application Ser. No. 09/169,489 entitled "Sector Shaping Transition System and Method," the disclosure of which is hereby incorporated herein by reference, the multiple transmission paths may be associated with various ones of the multiple antenna beams. In a preferred embodiment of the present invention, each antenna panel of a multiple antenna beam system provides four antenna beams and, thus, includes four separate paths. In turn, while only one delay equalization circuit is shown in FIG. 1, in this embodiment there might be a separate circuit for each such antenna beam signal path.

In the embodiment of FIG. 1, the system includes synthesis controller 11, that may include radio equipment transmitter inputs and signal path selection circuitry, such as an antenna beam signal switch matrix. Delay equalization block 21 of the present invention is included in preamp module 20 of FIG. 1. Of course, delay equalization block 21 may be disposed elsewhere in the signal path, such as in any of the cable portions or even within synthesis controller 11, if desired.

The depicted transmission path further includes cable portion 12, LPA 13, cable portion 14, and transmit filter 15 completing the coupling of the radio equipment of synthesis controller 11 to antenna panel coupler 16, which in turn is coupled to antenna array 16A. Antenna panel coupler 16 preferably includes coupler circuitry adapted to return a test signal sample for phase information analysis according to the present invention. For example, where a four antenna beam panel is utilized as described above, antenna panel coupler 16 may include a coupler for each antenna beam signal path and a four-way combiner that provides test signal feedback to the synthesis controller. Although the antenna array is shown separately at 16A, it should be appreciated that antenna panel coupler 16 and antenna array 16A may be embodied in a single structure. Additionally a beam forming matrix may be utilized by antenna array 16A in providing beam forming functions. This beam forming matrix may be conceptualized as a part of antenna array 16A, where delay equalization according to the present invention does not include the beam forming matrix in the signal paths equalized, or as a part of antenna panel coupler 16, where delay equalization according to the present invention does include the beam forming matrix in the signal paths equalized.

Synthesis controller 11 is preferably adapted to accept a test tone, such as from test tone generator 19, and selectively couple this test tone to transmission paths, such as through the use of the aforementioned switch matrix. Test tone generator 19 may comprise any suitable device or device combinations for providing a frequency incrementable (or decrementable) over a test signal band.

Synthesis controller 11 is also preferably adapted to accept a test tone feedback, such as from antenna panel coupler 16, and measure the phase difference between the test signal and the test signal feedback. In one embodiment, phase difference measurement is implemented with a conventional phase calibrator or comparator.

Accordingly, in operation of the preferred embodiment system of FIG. 1 test tone generator 19 generates a first test signal at a selected frequency of a frequency band of interest, such as a lowest or highest frequency of a frequency band utilized by the communication system. Synthesis controller 11 provides this RF test signal to cable portion 18 and there through to preamp module 20. It should be appreciated that according to a preferred embodiment, delays of delay equalization block 21 are selected to present a null delay during calibration steps. Of course, select amounts of delay may be provided by delay equalization block 21 during calibration, such as to compensate for a known path delay difference resulting in a phase rollover as between ones of the transmission paths being equalized, if desired. However, a preferred embodiment tracks and accumulates phase rollover in such signal paths, such as in a software process controlling the system, and therefore does not rely on the provision of delays during calibration.

The test signal proceeds to the linear power amplifier 13 via cable portion 12. The test signal then proceeds through cable portion 14 to the transmit filter 15, where it proceeds to antenna array 16A through the antenna panel coupler 16. Couplers within antenna panel coupler 16 return a sample of the test signal back to synthesis controller 11. Synthesis controller 11, or other suitable circuitry, measures the phase difference between the signal that it provides and the signal that it receives from the antenna panel. Test tone generator 19 generates a second test signal at a selected frequency offset from the first test signal to be routed through the transmission system as described above. When test signals of a desired frequency band have been passed through the transmission paths and measured as described above, the present invention operates to generate a phase versus frequency function for this path.

In equalizing delays of multiple transmission paths, the preferred embodiment of the present invention operates to select each such signal path and to provide the test signal thereto as described above. Selection of the signal paths may be accomplished through manipulation of a switch matrix such as may be included in synthesis circuit 11 of the preferred embodiment. Of course, other techniques may be utilized for selecting a transmission path for coupling a test signal to, such as through the use of controllable attenuation devices coupling the test signal to multiple signal paths or the activation of individual test tone generators coupled to each such signal path.

Once the system of FIG. 1 has generated a phase versus frequency function, or like information providing a representation of the phase and frequency relationship of the transmission path, a linear representation of the phase and frequency relationship of the transmission path is derived for use in determining an electrical delay for this path. When an electrical delay for each such transmission path has been determined, such information may be compared for a determination of an adjustment suitable at ones of the transmission paths to equalize the delays. For example, according to a most preferred embodiment, an electrical delay of greatest magnitude is selected as a reference electrical delay and a determination is made as to an amount of electrical delay to be provided by delay equalization block 21 of the remaining transmission paths to provide delay equalization. Manipulation of delay equalization block 21 may be provided by signals provided by the circuitry of synthesization circuit 11 in response to the above determination.

It should be appreciated from the above discussion of the operation of the present invention that the preferred embodiment synthesis circuit 11 includes control circuitry, such as may be provided by a processor-based system having memory associated therewith and operating under control of an instruction set of the present invention. Of course, control circuitry may be provided external to synthesis circuit 11 to provide all or a portion of the above mentioned control functions, if desired. Such control circuitry may comprise a general purpose computer system operable under control of an instruction set of the present invention and/or a special purpose computer operable under control of an instruction set of the present invention.

Figure 2:
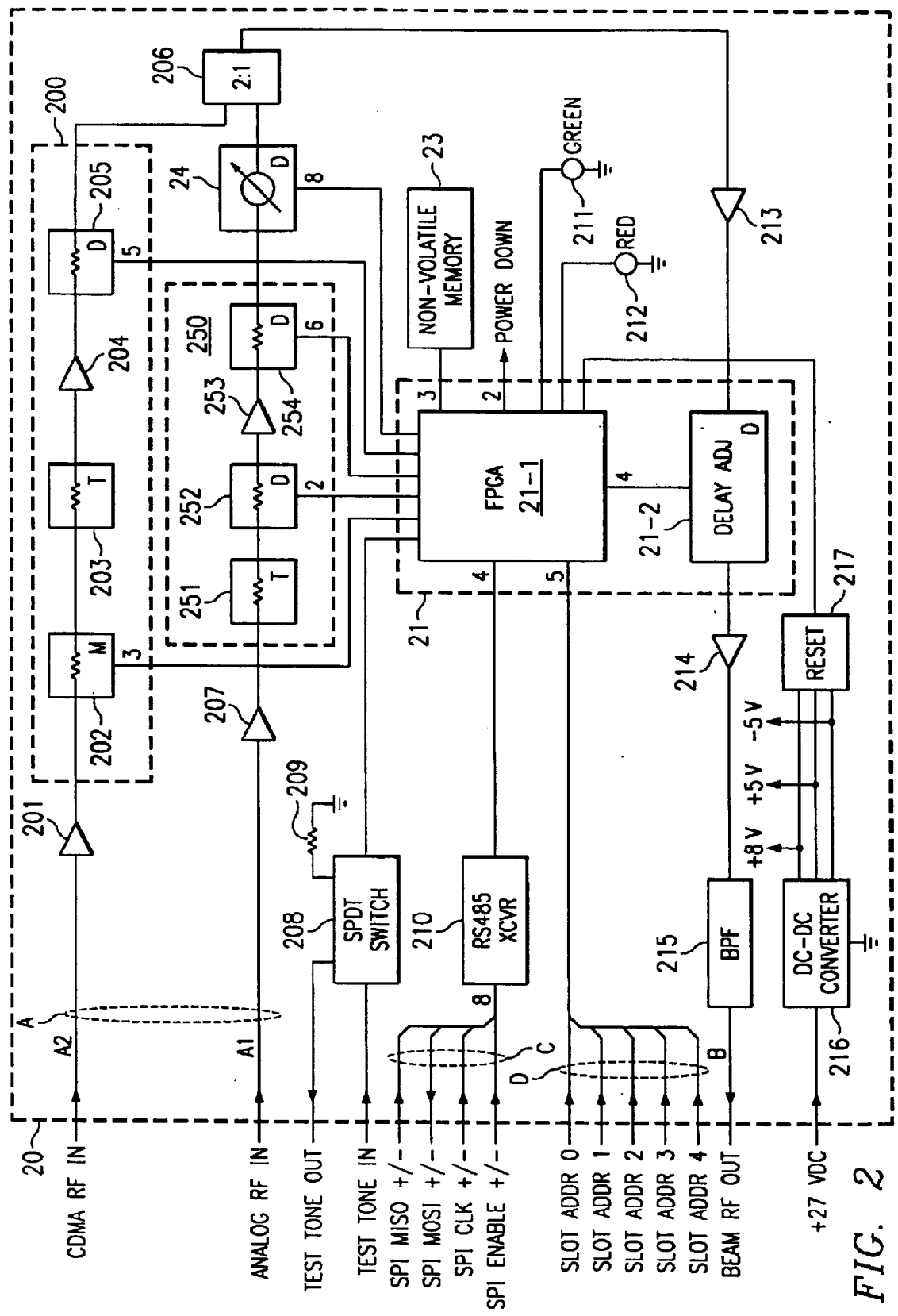
FIG. 2 shows a block diagram of one embodiment of a delay equalization module from the system of FIG. 1.

FIG. 2 shows one embodiment of a preamp module 20. Preamp module 20 of this preferred embodiment includes delay equalization circuit 21, CDMA gain control element 200, analog gain control element 250, amplifiers 201–204, 207, 213, 214, bandpass filter 215, analog phase controller 24, RF combiner 206, memory 23, alarms 211, 212, DC—DC converter 216, reset circuit 217, and RF switch 208. In the depicted embodiment, the delay equalization circuit is implemented with a programmable gate array ("FPGA") device 21-1 and a delay adjust circuit 21-2. The CDMA gain control element 200 includes gain calibration device 202, thermal compensator 203, amplifier 204, and digital gain control 205. The analog gain control element 250 includes thermal compensator 251, digital gain controls 252 and 254 and amplifier 253.

Preamp module 20 has several inputs and outputs. The RF transmit signal (such as might be either a digital signal, such as TDMA or CDMA, or an analog, e.g., AMPS, signal) to be coupled to the antenna array is connected at inputs A. The signals of the communication system associated with users will preferably be inactive when the synthesis controller 11 is acquiring phase/frequency data and are active when the communications system is in operation since the preferred embodiment test tone steps through the frequency band of these signals. Of course, the present invention may be operated to disable or otherwise make unavailable for use only particular channels of the communication system subject to interference by the then utilized test tone, if desired. During calibration according to the present invention the test tone is preferably provided through inputs A (depending upon which signal path is being calibrated).

The phase controller 24 of a preferred embodiment, such as may be provided by a binary weighted phase shifter, is used for controlling the phase of one signal path relative to the other three. This permits broadband beam forming. Preferably, the phase adjust increments provided by phase controller 24 are smaller than those of delay equalization block 21 to allow beam forming after delay equalization is complete. Of course similar phase control may be separately provided in the digital signal path of FIG. 2, such as within block 200, if desired.

Delay equalization circuit 21 is preferably controlled by control signals from synthesis controller 11 via a peripheral interface at input C. Input D is preferably an address line that establishes the identification of the particular FPGA to the synthesis controller 11. The controller can query each FPGA (there is preferably one for each path) and determine this address.

Block 208 of FIG. 2 is an RF switch that is provided to control a test tone that is used for analog path diagnostics and gain control calibration. The test tone associated with block 208, therefore, is not used for the delay equalization of the present invention.

C. Equalization Method

Figure 3:
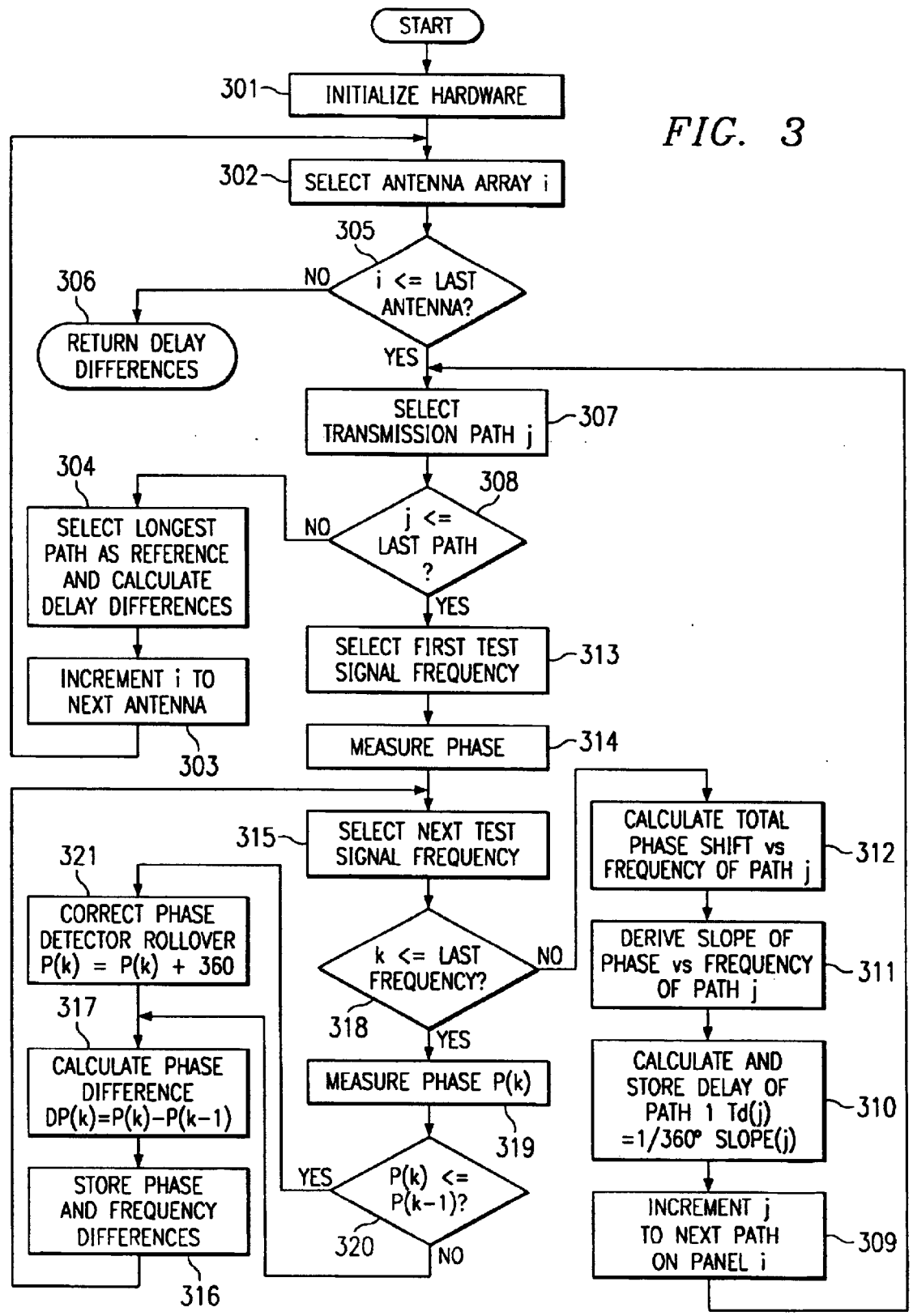
FIG. 3 shows one embodiment of a routine for performing a delay equalization method of the present invention.

FIG. 3 shows a routine for performing one embodiment of a delay equalization according to the present invention. For example, it could be performed in synthesis controller 11 with the system of FIGS. 1 and 2. This preferred embodiment routine assumes that three conditions are substantially satisfied.

The first condition is that the design of the phase detector (e.g., within synthesis controller 11) for measuring the phase differences of the test signal increments is such that increasing the test frequency produces a counter-clockwise phase rotation of the test signal.

The second condition is that frequency increment size is limited to reduce phase rollover due to frequency step. This condition may rely upon a small difference in frequency to ensure that phase difference will be less than 360 degrees during a frequency step. Preferably the maximum step size is set by the longest expected transmission path. Substituting the equation for phase delay given above into the equation $L=T_p Kc$, where L is the length of the transmission path, K is the velocity factor, and c is the speed of light, gives $L=Kc/360((\Delta\phi/\Delta f))$. Solving for $\Delta f$ and setting $\Delta\phi=360$ gives $\Delta f=984K/L$, where $c=984$ ft/$\mu$s.

Figure 4:
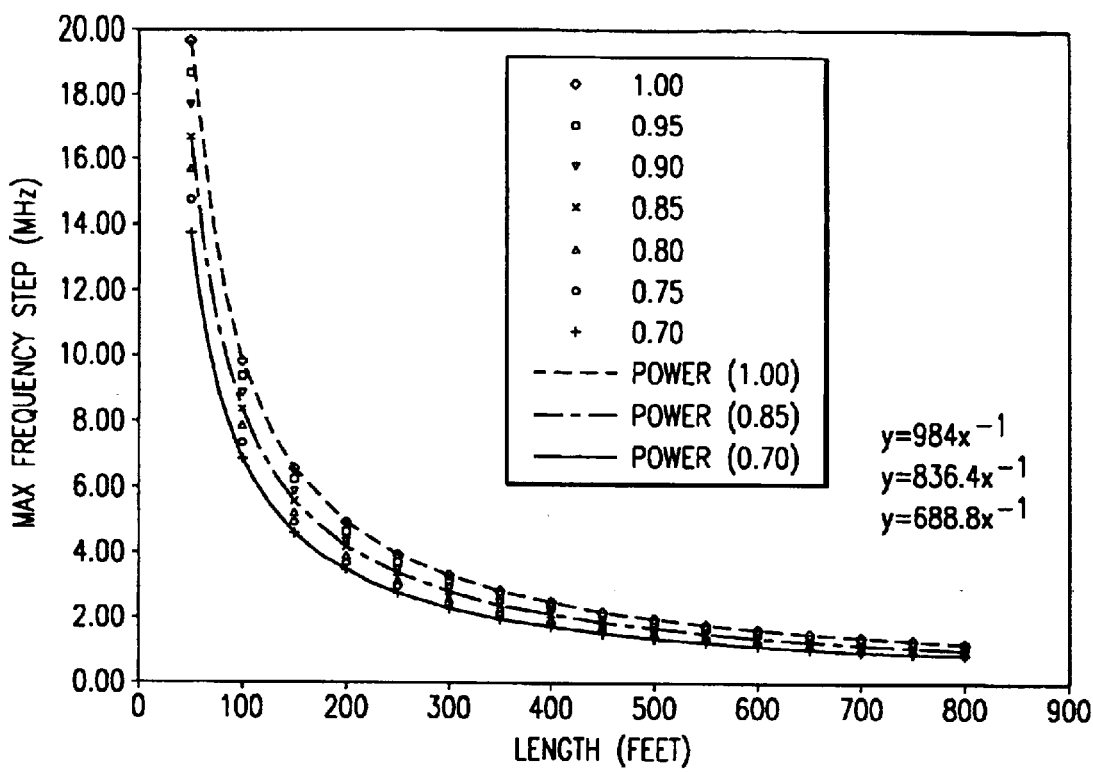
FIG. 4 depicts a plot of maximum frequency step versus transmission line length for a delay equalized system.

The graph of FIG. 4 plots a maximum frequency step versus transmission line length. In practice, the length is measured on a two-way round trip basis with the tallest structure being about ½ the length shown on the graph less any fixed system delays between the test signal injection point and the transmission line. For example, in a system with a 300 foot tower, the length of the phase calibration path is approximately 600 feet. In a 600 foot path with a nominal velocity factor of 0.85, the max. $\Delta f$ for no phase roll is 1.39 MHz.

The third condition is that phase versus frequency data can be measured across the operating bandwidth. Resolution in length is due primarily to uncertainty in phase detector measurements. It can be shown that this constraint may require a large frequency to minimize the uncertainty in measured length. For example, with an 8-bit phase detector, the uncertainty in the difference between two phase measurements would be no better than 2.8 degrees. An uncertainty of 2.8 degrees at a frequency step of 1.39 MHz translates into a 4 to 5 foot uncertainty in the length measurement. The uncertainty is reduced if the frequency span is increased. The maximum possible spacing in the B band 881 to 894 MHz. (13 MHz. spacing) limits the resolution and works out to an uncertainty in length of about 6 inches. Uncertainty in length is directly related to the phase difference measurement uncertainty. For example, doubling the uncertainty to 5.6 degrees would double the length uncertainty to 1 foot, or about one wave length for a typical transmission path propagation constant of 0.85. Measuring phase response versus frequency across the entire band also allows one to average or otherwise smooth the non-linear phase characteristics of any filters in the path that normally occur at the band edges.

With these conditions in mind, the steps of the preferred embodiment of FIG. 3 will now be described. At step 301, the hardware is initialized. At step 302, a particular antenna array is selected, such as a particular antenna array panel of a multiple panel system. At step 305, the routine confirms that it has not calibrated all of the antenna arrays. If it has calibrated all of the arrays, it is completed at step 306. Otherwise, it proceeds to step 307 and selects a transmission path, such as a particular antenna beam path of a selected multiple beam antenna panel.

At step 308, the method of FIG. 3 confirms that the selected transmission path is not beyond the last path to be tested (i.e., has not tested all of the paths within the array or all of the paths to have delays equalized according to the present invention). If the selected path is not beyond the parameters of the last path to be tested, then at step 313, it selects the first test frequency. At step 314, it measures the phase of this first test signal from the output of the transmission path. At step 315, it selects the next test frequency. At step 318, it confirms that this next test frequency is not out of the desired sweep range. If not, then at step 319, it measures the output phase based on this test signal.

At step 320, the method of FIG. 3 confirms that this measured phase is not less than or equal to the previously measured phase. This is done to ensure that the phase has not rolled over. If the measurement is proper (greater than previous measurement), then at step 317 it calculates the phase difference for these test signals. At step 316, the phase and frequency differences are stored in memory for generating he phase versus frequency curve. From here, the routine returns to step 315 and proceeds as previously described. However, if, at step 320, the measured phase was not properly greater than the previously measured phase, then at step 321, the rollover is corrected (e.g., augmented by 360 degrees), and the routine would proceed to step 317 and calculate the appropriate phase difference as described above.

When all of the frequencies within the test range have been measured, as determined by, step 318 confirming that this next test frequency is out of the desired sweep range, then at step 312, the routine calculates the overall phase versus frequency shift curve for this path. At step 311, the slope of the curve is derived. This preferably involves forcing (or fitting) an averaged, linear component onto the curve. This may be done with a least squares methodology. At step 310, delay for this path is calculated and stored, and at step 309, the routine increments a count for selecting the next path and proceeds to step 307 where this next path is selected.

Once the delay for the last path has been calculated, as determined by step 308 confirming that the selected transmission path is not beyond the last path to be tested, the routine preferably determines which path has the longest delay (step 304) and identifies that path as a reference path. The preferred embodiment then calculates the delay differences for the other paths based on this reference path. It then can cause delay to be added in each of these other paths in accordance with their difference from the reference path. At step 303, it increments an antenna array count and goes to step 302 where it proceeds as previously described. In this way, the transmission paths for each antenna array may be equalized. Of course, there is no limitation that all antenna arrays, or even all signal paths of any particular antenna array, be equalized according to the present invention.

Figure 5:
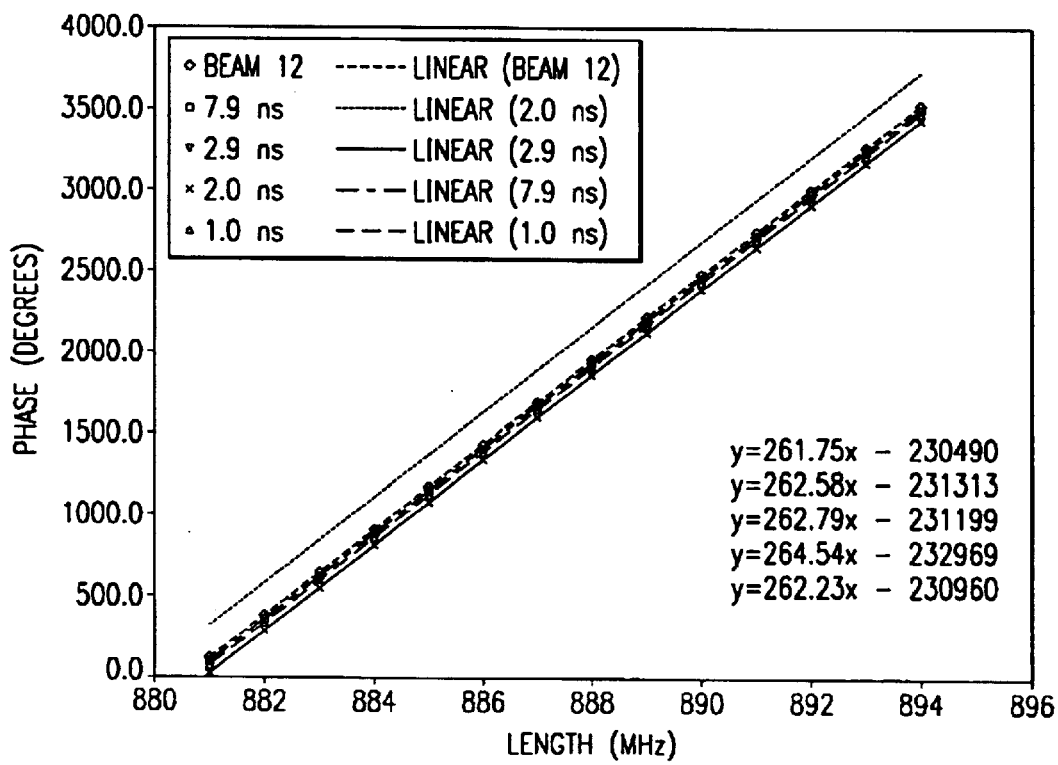
FIG. 5 graphically illustrates the detection accuracy and resolution of this method with an exemplary system.

FIG. 5 graphically illustrates the detection accuracy and resolution of this method with an exemplary system. In this example, test data was taken on a single transmission path of approximately 280 feet with known delays of 7.9, 2.9, 2.0, and 1.0 nanoseconds added to the path. Using the slope of the linear fit to the test data and the relationship that $T_d=1/360*\text{slope}$, the measured delay differences were found to be 7.7, 2.9, 2.3, and 1.3 nanoseconds.

Although preferred embodiments of the present invention have been described with reference to a forward link signal path, it should be appreciated that the present invention may be utilized in equalizing reverse link signal paths substantially as described above. A preferred embodiment of a system utilized in the reverse link is provided as above with the path of the test signal being reversed, i.e., the test signal introduced into the antenna panel coupler and subsequently propagating through receive circuitry such as amplifiers, filters, and the like.

It should be appreciated that although the present invention has been described with reference to a multiple beam antenna panel, there is no limitation that the present invention operate with such antenna structure. For example, the present invention may operate with the antenna beam signal paths of a conical multiple beam antenna such as shown and described in U.S. Pat. No. 5,940,048, the disclosure of which is hereby incorporated herein by reference. Moreover, the present invention is operable with any number of antenna system technologies presenting various signal paths benefiting from delay adjustment according to the present invention, such as antenna systems utilizing adaptive array technology. Likewise, the present invention is operable to delay adjust multiple signal paths unrelated or otherwise not coupled to antenna structure which benefit from adjustment according to the present invention.

Although preferred embodiments have been described above with reference to the use of test frequencies for measuring delays, it should be appreciated that the present invention may utilizes frequencies native to the system to provide delay information, if desired. For example, the present invention may rely upon user transmissions in channels throughout the frequency band at various times to determine delay information as described above. Thereafter, this information may be utilized in the manner described above with respect to the embodiment utilizing test frequencies.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is clamed is:

1. A method of equalizing electrical delay of a plurality of signal paths, comprising:

measuring electrical delay for each of the plurality of signal paths over a selected frequency range;

determining a linear relationship between phase and frequency for said frequency range at least in part through reference to measured electrical delay information; and modifying the delay of one or more paths of said plurality of signal paths based at least in part on said linear relationship to provide a substantially equal electrical delay over said selected frequency range.

2. The method of claim 1, wherein the act of modifying includes controllably adding delay to the one or more paths.

3. The method of claim 2, wherein controllably adding delay comprises:

selecting delays of a binary weighted delay line substantially providing a desired amount of delay.

4. The method of claim 1, further comprising:

selecting as a reference path a path of said plurality of signal paths with a largest delay and adding delay to the other paths of said plurality of signal paths so that their delay is substantially equal to the reference path.

5. The method of claim 1, wherein determining a linear relationship comprises:

deriving a phase versus frequency change curve for each path.

6. The method of claim 5, wherein the phase versus frequency change curve is derived by measuring change in path output phase versus change in path input test frequency, wherein a plurality of test signals having incrementally increasing frequencies are input to a path in deriving its curve.

7. The method of claim 6, wherein the plurality of incrementally increasing test frequencies have incremental increases that are determined at least in part to be sufficiently small to sufficiently reduce phase rollover.

8. The method of claim 5, wherein determining a linear relationship further comprises:

linear fitting the curve to derive an overall slope for the curve.

9. The method of claim 8, wherein the delay for each path of said plurality of signal paths is derived from the linear-fitted slope.

10. The method of claim 1, wherein said selected frequency range is a range of frequencies substantially corresponding to a range of frequencies to be communicated through said signal paths.

11. The method of claim 10, wherein said range of frequencies to be communicated through said signal paths includes a range of frequencies associated with a first communication service and a range of frequencies associated with a second communication service.

12. The method of claim 10, wherein said range of frequencies to be communicated through said signal paths is a range of frequencies associated with communication services provided by at least one of the communication service group consisting of:

analog cellular telephony;

CDMA cellular telephony;

TDMA cellular telephony; and

PCS communications.

13. A method of phase calibrating signal paths of a multiple beam communication system having a phased array antenna coupled to a beam forming matrix, wherein a plurality of antenna beam signal interfaces are provided by the beam forming matrix for coupling to a plurality of antenna beam signal paths of the communication system, the method comprising:

selecting a first group of antenna beam signal paths from said plurality of antenna beam signal paths for delay equalization;

selecting a test frequency range and a test frequency increment/decrement;

measuring delay for each signal path of the first group of antenna beam signal paths with respect to said test frequency range at intervals substantially corresponding to said increment/decrement;

determining a relationship between phase and frequency for each signal path of the first group of antenna beam signal paths at least in part through reference to measured delay information associated therewith; and adjusting a delay of one or more paths of the first group of antenna beam signal paths based at least in part on said relationship between phase and frequency.

14. The method of claim 13, wherein said first group of antenna beam signal paths are associated with a same multiple beam antenna structure.

15. The method of claim 14, wherein said plurality of antenna beam signal paths include a second group of antenna beam signal paths associated with a second multiple beam antenna structure.

16. The method of claim 15, further comprising:

selecting said second group of antenna beam signal paths for delay equalization;

measuring delay for each signal path of the second group of antenna beam signal paths with respect to said test frequency range at intervals substantially corresponding to said increment/decrement;

determining a relationship between phase and frequency for each signal path of the second group of antenna beam signal paths at least in part through reference to measured delay information associated therewith; and adjusting a delay of one or more paths of the second group of antenna beam signal paths based at least in part on said relationship between phase and frequency.

17. The method of claim 13, wherein the test frequency range is selected to substantially correspond to signals to be communicated by said communication system.

18. The method of claim 17, wherein said test frequency range is at least 40 MHz.

19. The method of claim 17, wherein said test frequency range substantially corresponds to a cellular carrier frequency assignment.

20. The method of claim 17, wherein said test frequency range substantially corresponds to frequency assignments of two communication services.

21. The method of claim 13, wherein measuring delay for each signal path of said first group of antenna beam signals comprises:

determining change in phase versus change in frequency to track phase shift as the test frequency is swept over the test frequency range.

22. The method of claim 13, wherein the test frequency increment/decrement is selected to provide increments small enough that a phase roll-over condition can be detected.

23. The method of claim 13, wherein determining a relationship between phase and frequency for each signal path of said first group of antenna beam signal paths comprises:

determining a linear relationship between phase and frequency for each signal path.

24. The method of claim 23, wherein said linear relationship comprises:

deriving a phase versus frequency change curve for each signal path of said first group of antenna beam signal paths and extracting a linear component from the phase versus frequency function.

25. The method of claim 24, wherein the delay for each signal path of said first group of antenna beam signal paths is derived from said linear component.

26. A system for adjusting electrical delay of a plurality of signal paths, comprising:

a plurality of signal paths;

phase comparison circuitry providing a comparison of a phase of an input signal with a phase of a feedback signal and providing information with respect to an electrical delay for each of the plurality of signal paths over a selected frequency range;

processor circuitry in communication with said phase comparison circuitry and operable upon said electrical delay information to determine a linear relationship between phase and frequency for each of the plurality of signal paths for said frequency range; and phase adjustment circuitry in communication with said processor circuitry and accepting control signals therefrom to modify a delay of one or more signal paths of said plurality of signal paths based at least in part on said linear relationship.

27. The system of claim 26, wherein modification of delays by said phase adjustment circuitry provides substantially equivalent signal path electrical delays with respect to each signal path of said plurality of signal paths.

28. The system of claim 26, further comprising:

a test frequency generator controllably coupleable to said plurality of signal paths, wherein said test frequency generator provide test frequencies throughout said frequency range.

29. The system of claim 28, wherein said test frequencies provided by said test frequency generator are distributed throughout said frequency range substantially at predetermined intervals.

30. The system of claim 29, wherein said predetermined intervals determined at least in part to be sufficiently small to sufficiently reduce phase rollover.

31. The system of claim 28, wherein control of connection of said test frequency generator to a particular signal path of said plurality of signal paths is provided by a processor-based controller of said processor circuitry.

32. The system of claim 31, wherein said controller operates to couple said test frequency generator to each signal path of said plurality of signal paths separately.

33. The system of claim 32, further comprising:

a switch matrix coupled to said processor-based controller, said test frequency generator, and said plurality of signal paths, wherein said separate coupling of said test frequency generator is provided by manipulation of said switch matrix by said processor-based controller.

34. The system of claim 32, further comprising:

a first antenna structure, wherein said plurality of signal paths are coupled to said first antenna structure.

35. The system of claim 34, further comprising:

a second antenna structure, wherein another plurality of signal paths are coupled to said second antenna structure.

36. The system of claim 26, wherein said phase adjustment circuitry comprises:

a plurality of predetermined amounts of delay.

37. The system of claim 36, wherein ones of said predetermined amounts of delay are selected under control of a processor-based system.

38. The system of claim 36, wherein said plurality of predetermined amounts of delay are provided by a binary weighted delay line apparatus.

39. The system of claim 26, wherein said processor circuitry comprises:
- a processor-based controller adapted to select a reference signal path from said plurality of signal paths based at least in part on said electrical delay information, wherein modification of said delay of said one or more signal paths of said plurality of signal paths is made with reference to said reference signal path.

40. The system of claim 26, wherein said frequency range is a range of frequencies substantially corresponding to a range of frequencies to be communicated through said signal paths.

41. The system of claim 40, wherein said range of frequencies to be communicated through said signal paths includes a range of frequencies associated with a first communication service and a range of frequencies associated with a second communication service.

42. The system of claim 40, wherein said range of frequencies to be communicated through said signal paths is a range of frequencies associated with communication services provided by at least one of the communication service group consisting of:
- analog cellular telephony;
- CDMA cellular telephony;
- TDMA cellular telephony; and
- PCS communications.

43. A system for phase calibrating signal paths of a multiple beam communication system having a phased array antenna coupled to a beam forming matrix, wherein a plurality of antenna beam signal interfaces are provided by the beam forming matrix for coupling to a plurality of antenna beam signal paths of the communication system, the system comprising:
- a first group of antenna beam signal paths;
- a test frequency source providing test frequency signals in a predetermined frequency range;
- a phase comparator coupled to said first group of antenna beam signal paths and to a feedback signal path, wherein said phase comparator is adapted to measure delay for each signal path of the first group of antenna beam signal paths with respect to said test frequency signals provided by said test frequency source;
- a processor-based system operable to determine a relationship between phase and frequency for each signal path of the first group of antenna beam signal paths at least in part through reference to measured delay information provided by said phase comparator; and
- phase adjustment circuitry disposed in ones of said first group of antenna beam signal paths providing adjustable delays in said ones of said first group of antenna beam signal paths based at least in part on said relationship between phase and frequency.

44. The system of claim 43, wherein said phase adjustment circuitry is operable to adjust delays in said ones of said first group of antenna beam signal paths under control of said processor-based system.

45. The system of claim 44, wherein said phase adjustment circuitry comprises a binary switched delay circuit.

46. The system of claim 43, herein said phase comparator is operable under control of said processor-based system.

47. The system of claim 43, wherein said further comprising:
- a multiple antenna beam structure, wherein said plurality of signal paths are antenna beam signal paths associated with antenna beams of said multiple antenna beam structure.

48. The system of claim 43, wherein the predetermined frequency range is selected to substantially correspond to signals to be communicated by said communication system.

49. The system of claim 48, wherein the predetermined frequency range substantially corresponds to a cellular carrier frequency assignment.

50. The system of claim 48, wherein the predetermined frequency range substantially corresponds to frequency assignments of two communication services.

51. The system of claim 43, wherein said test frequency signal in said predetermined frequency range are distributed throughout said predetermined frequency range substantially at predetermined intervals.

52. The system of claim 51, wherein the predetermined intervals are selected to facilitate detection of a phase roll-over condition.

* * * * *